United States Patent Office 3,397,151
Patented Aug. 13, 1968

3,397,151
PROCESS OF PRODUCING A SILICATE-CARBON COMPLEX
Walter R. Payment, Evanston, Ill., assignor to W. R. Grace & Co., New York, N.Y., a corporation of Connecticut
No Drawing. Filed Oct. 15, 1965, Ser. No. 496,690
6 Claims. (Cl. 252—378)

ABSTRACT OF THE DISCLOSURE

A method of producing a silicate-carbon complex which comprises mixing ore selected from the group consisting of vermiculite and perlite with a compound selected from the group consisting of sorbitol, glycerol, and glyceride, and heating said mixture to a temperature sufficient to exfoliate said ore and carbonize said compound.

---

This invention relates to a novel method for producing a carbon-silicate complex. In one specific aspect it relates to a method of producing a vermiculite-carbon complex.

It is an object of this invention to provide a black colored expanded vermiculite in which the color cannot easily be removed.

This and further objects of the present invention will become readily apparent from the following detailed description and examples.

Broadly, this invention contemplates intimately mixing vermiculite ore with a carbon compound and heating this mix to a temperature sufficient to exfoliate the vermiculite and carbonize the carbon compound.

The standard commercial vermiculite ores are applicable to this invention, with the No. 2 Libby ore and the No. 4 Travelers Rest ore produced by the Zonolite Division of W. R. Grace & Co. giving particularly good results. African vermiculite ore also gives good results.

A very large number of organic substances can be added to vermiculite ore to form complexes which will darken when subjected to exfoliation temperatures. However, it is desirable to use those organic compounds which have a high carbon content, and among these sorbitol, glycerol and the glycerides are preferred. Also, the choice of organic compound will depend upon the degree of black color desired in the finished product.

The carbon compound can be applied to the vermiculite ore by conventional methods such as spraying, soaking, washing and the like.

The concentration of the carbon compound whether used as 100% solution or in dilute solution (i.e. 20.1) and the contact time between the vermiculite ore and the carbon compound are not critical to color development. The particle size of the vermiculite ore appears to be the determining factor in the resulting color. The smaller the particle size, the greater the surface area per unit volume and hence, the darker the color.

Exfoliation temperatures of from 600° F. to about 1800° F. have been successfully used to expand the vermiculite ore and produce a dark vermiculite. The preferred range wherein the most desirable degree of color development takes place is from about 1200° F. to about 1500° F.

The vermiculite-carbon complex of this invention is extremely useful in many varied applications, such as a base for charcoal; as a mulch wherein the vermiculite will absorb water and the dark color absorb heat; as a soil conditioner; as a filler for charcoal briquets; as a darkener for natural concrete; for decorative effect in acoustical materials and plaster.

It is understood, other materials (such as perlite) which are absorbent, inert and stable at high temperatures are within the scope of this invention.

This invention is illustrated, but not restricted by the following examples.

Example I

A No. 2 Libby vermiculite ore was soaked in a 10% aqueous solution of sorbitol. After 5 minutes the solution was decanted off and the ore allowed to dry. The dry vermiculite ore-sorbitol mix was then heated to 1200° F. in a muffle furnace. The vermiculite ore was expanded in the furnace and the sorbitol carbonized, giving a black exfoliated vermiculite product.

The resultant black vermiculite was agitated for 10 minutes in each of the following: (1) distilled water, (2) acetic acid solution, (3) ammonium hydroxide solution and (4) boiling water. There was no discoloration in any of the liquids indicating that the carbon is bonded to the vermiculite surface and cannot easily be removed.

Example II

Perlite ore was soaked in a 10% aqueous solution of sorbitol for 5 minutes, the solution decanted off the ore dried. The perlite-sorbitol mix was heated in a muffle furnace to 1000° F.

This produced a novel "salt and pepper" effect on the expanded perlite with the color ranging from light grey to black.

What is claimed is:
1. The method of producing a silicate-carbon complex, which comprises mixing ore selected from the group consisting of vermiculite and perlite with a compound selected from the group consisting of sorbitol, glycerol, and glyceride, and heating said mixture to a temperature sufficient to exfoliate said ore and carbonize said compound.
2. The method according to claim 1 wherein the ore is vermiculite.
3. The method according to claim 1 wherein the ore is perlite.
4. The method according to claim 1 wherein the compound is sorbitol.
5. A method of producing an exfoliated vermiculite-carbon complex, which comprises mixing unexfoliated vermiculite and ore with an aqueous solution of a compound selected from the group consisting of sorbitol, glycerol and glyceride, and heating said mixture to a temperature sufficient to exfoliate said vermiculite and carbonize said compound.
6. An exfoliated vermiculite-carbon complex derived from vermiculite ore having sorbitol absorbed thereon, said sorbitol being carbonized upon the exfoliation of said vermicuilte ore.

References Cited

FOREIGN PATENTS 13,216    1964    Japan.

OTHER REFERENCES

Paint, Oil and Chemical Review, Graphitic Mica, by Dell et al. (Oct. 19, 1944), pp. 12, 16, and 18.
Vermiculite: Chemical and Physical Properties, by Zonolite Company (Mar. 7, 1955), p. 9.

DANIEL E. WYMAN, Primary Examiner.
L. G. MANDONI, Assistant Examiner.